(12) United States Patent
Brookins (10) Patent No.: US 9,739,463 B1
(45) Date of Patent: Aug. 22, 2017

(54) DOCK PILE LIGHTING SYSTEM WITH ELASTIC LIGHTING SOURCE

(71) Applicant: Keith Donald Brookins, Miami, FL (US)

(72) Inventor: Keith Donald Brookins, Miami, FL (US)

( * ) Notice: Subject to any disclaimer, the term of this patent is extended or adjusted under 35 U.S.C. 154(b) by 386 days.

(21) Appl. No.: 14/505,998

(22) Filed: Oct. 3, 2014

Related U.S. Application Data (63) Continuation-in-part of application No. 14/052,888, filed on Oct. 14, 2013, now Pat. No. 9,488,347.

(51) Int. Cl.
| | |
|---|---|
| *F21V 5/00* | (2015.01) |
| *F21V 21/14* | (2006.01) |
| *F21K 99/00* | (2016.01) |
| *F21V 8/00* | (2006.01) |
| *F21W 131/10* | (2006.01) |
| *F21Y 111/00* | (2016.01) |
| *F21V 21/32* | (2006.01) |
| *F21V 15/01* | (2006.01) |
| *F21Y 107/30* | (2016.01) |
| *F21Y 107/70* | (2016.01) |
| *F21S 4/22* | (2016.01) |

(52) U.S. Cl.
CPC .............. *F21V 21/14* (2013.01); *F21K 9/30* (2013.01); *G02B 6/0005* (2013.01); *F21S 4/22* (2016.01); *F21V 15/012* (2013.01); *F21V 21/32* (2013.01); *F21V 2200/10* (2015.01); *F21V 2200/13* (2015.01); *F21W 2131/10* (2013.01); *F21Y 2107/30* (2016.08); *F21Y 2107/70* (2016.08); *F21Y 2111/00* (2013.01); *G02B 6/0006* (2013.01); *G02B 6/0008* (2013.01)

(58) Field of Classification Search
CPC ...... F21V 21/14; F21V 15/012; F21V 15/013; F21V 21/32; F21V 2200/10; F21V 2200/13; F21V 2200/15; F21V 2200/17; F21W 2131/10; G02B 6/0008; F21S 4/26; F21S 4/22; F21S 4/20; F21Y 2107/70; F21Y 2107/00; F21Y 2107/30; F21Y 2111/00
USPC ....... 362/576, 565, 555, 151, 152, 559, 570, 362/145, 431, 564, 567, 581, 568, 249.03, 362/249.04, 249.06
See application file for complete search history.

(56) References Cited

U.S. PATENT DOCUMENTS

| | | | | |
|---|---|---|---|---|
| 2,359,559 | A | * | 10/1944 | Horky .................... A47G 33/06 362/565 |
| 3,145,934 | A | * | 8/1964 | Guggemos .............. F21S 8/088 362/382 |
| 3,253,276 | A | * | 5/1966 | Nagel ........................ B64F 1/20 340/815.76 |

(Continued)

*Primary Examiner* — Bryon T Gyllstrom
*Assistant Examiner* — James Endo
(74) *Attorney, Agent, or Firm* — Albert Bordas, P.A.

(57) ABSTRACT

A lighting system, having a base cone assembly, a base plate that mounts onto a dock pile, and an electrical system having at least one adjustable diameter lighting source. The present invention further has a tip cone mounted onto the base cone assembly. The tip cone has at least one light slot or clear section to permit light to emit there through. The tip cone and the base cone assembly are apex shaped. Extending from the tip cone is a mast bolt that secures to the base plate. The at least one adjustable diameter lighting source has at least one LED source and regulator. The at least one adjustable diameter lighting source emits radial and/or downward lighting onto the dock pile.

13 Claims, 12 Drawing Sheets

(56) References Cited

U.S. PATENT DOCUMENTS

| | | | | |
|---|---|---|---|---|
| 3,605,149 A * | 9/1971 | Keats | B63B 22/166 | 441/16 |
| 3,767,910 A * | 10/1973 | Harrigan | F21V 17/04 | 362/569 |
| 4,344,110 A * | 8/1982 | Ruediger | B63B 45/02 | 136/291 |
| 4,521,832 A * | 6/1985 | Barbour | F21L 4/00 | 200/60 |
| 5,224,773 A * | 7/1993 | Arimura | F21V 5/00 | 362/227 |
| 5,680,496 A * | 10/1997 | Burkitt, III | G02B 6/001 | 362/36 |
| 5,984,489 A * | 11/1999 | Rubenstein | F21S 2/00 | 362/123 |
| 6,260,989 B1 * | 7/2001 | Ingraselino | A63H 37/00 | 362/249.06 |
| 6,322,237 B1 * | 11/2001 | Lee | B60Q 1/326 | 362/234 |
| 6,386,728 B1 * | 5/2002 | Colonna | F21S 10/005 | 362/123 |
| 6,663,260 B1 * | 12/2003 | Tieszen | G01N 21/8806 | 362/249.02 |
| 6,705,751 B1 * | 3/2004 | Liu | F21S 6/005 | 362/153.1 |
| 7,021,808 B2 * | 4/2006 | Currie | G02B 6/001 | 362/551 |
| 7,090,377 B2 * | 8/2006 | Chen | B60Q 1/00 | 362/230 |
| 7,327,930 B2 * | 2/2008 | Koren | F21K 9/00 | 362/551 |
| 7,334,921 B1 * | 2/2008 | Simnor | F21V 21/30 | 362/249.01 |
| 2002/0145878 A1 * | 10/2002 | Venegas, Jr. | F21S 8/083 | 362/431 |
| 2002/0148183 A1 * | 10/2002 | Grant | F21S 8/081 | 52/300 |
| 2003/0128541 A1 * | 7/2003 | Liu | F21V 21/02 | 362/249.08 |
| 2005/0195608 A1 * | 9/2005 | Wu | F21S 4/22 | 362/320 |
| 2005/0201089 A1 * | 9/2005 | Lee | F21S 10/005 | 362/227 |
| 2007/0291473 A1 * | 12/2007 | Traynor | A01K 11/00 | 362/106 |
| 2008/0180949 A1 * | 7/2008 | Liao | F21V 21/088 | 362/249.12 |
| 2012/0243212 A1 * | 9/2012 | Smith | H05K 1/028 | 362/183 |

\* cited by examiner

DOCK PILE LIGHTING SYSTEM WITH ELASTIC LIGHTING SOURCE

OTHER RELATED APPLICATIONS

The present application is a continuation-in-part of pending U.S. patent application Ser. No. 14/052,888, filed on Oct. 14, 2013, which is hereby incorporated by reference.

BACKGROUND OF THE INVENTION

Field of the Invention

The present invention relates to lighting systems, and more particularly, to dock pile lighting systems with adjustable diameter lighting sources for a wide range of shapes and diameters and its peripheral devices.

Description of the Related Art

Applicant is not aware of any lighting systems for dock piles suggesting the novel features of the present invention, and specifically no dock pile lighting systems with adjustable diameter lighting sources for a wide range of shapes and diameters having peripheral devices.

SUMMARY OF THE INVENTION

The instant invention is a dock pile lighting system having adjustable diameter lighting sources. More specifically, the present invention is a lighting system, comprising a base cone assembly, a base plate that mounts onto a dock pile, and an electrical system comprising at least one adjustable diameter lighting source. The present invention further comprises a tip cone mounted onto the base cone assembly. The tip cone comprises at least one light slot or clear section to permit light to emit there through. The tip cone and the base cone assembly are a cone on cylinder configuration. Extending from the tip cone is a mast bolt that secures to the base plate.

The at least one adjustable diameter lighting source comprises at least one LED source and regulator. In a preferred embodiment, the at least one adjustable diameter lighting source is an adjustable diameter flex lighting source. Alternate embodiments of the adjustable diameter lighting source include an adjustable diameter closed chain lighting source, an adjustable diameter semi open-ended chain lighting source, adjustable diameter lighting source is an adjustable diameter open-ended chain lighting source, and an adjustable diameter lighting source is an adjustable diameter radial lighting source.

The at least one adjustable diameter lighting source emits radial and/or downward lighting onto the dock pile.

The present invention further comprises wrap molding. The wrap molding comprises at least one channel. The at least one channel may receive at least one optic fiber, color bead, and/or rope lighting of the electrical system. The wrap molding comprises exterior and interior walls and exterior and interior flap walls extending between top and bottom ends.

The present invention further comprises molding. The molding comprises at least one channel. The at least one channel may receive at least one optic fiber, color bead, and/or rope lighting of the electrical system. The molding comprises exterior and interior walls extending between top and bottom ends.

It is therefore one of the main objects of the present invention to provide a dock pile lighting system with adjustable diameter lighting sources that provides radial and down lighting, as well as source lighting to optic fiber, for dock piles and dock platforms.

It is another object of this invention to provide a dock pile lighting system with adjustable diameter lighting sources that comprises a unique two-piece cone system defined as a base cone assembly and a tip cone.

It is another object of this invention to provide a dock pile lighting system with adjustable diameter lighting sources to house and accommodate light sources utilizing a unique mast bolt design.

It is another object of this invention to provide a dock pile lighting system with adjustable diameter lighting sources shaped to deter bird loitering.

It is another object of this invention to provide a dock pile lighting system with adjustable diameter lighting sources to keep water out of the end grain of wood dock piles.

It is another object of this invention to provide a dock pile lighting system with adjustable diameter lighting sources that conceals all mounting hardware.

It is another object of this invention to provide a dock pile lighting system with adjustable diameter lighting sources that can be readily assembled, installed, and disassembled.

It is another object of this invention to provide a dock pile lighting system with adjustable diameter lighting sources that is rust free, whereby system parts do not rust.

It is another object of this invention to provide a dock pile lighting system with adjustable diameter lighting sources that provides multi-layers of function including independently functioning light sources and styles.

It is another object of this invention to provide a dock pile lighting system with adjustable diameter lighting sources that provides controllability, which in turn is function.

It is another object of this invention to provide a dock pile lighting system with adjustable diameter lighting sources that does not over light, rob night vision, or commit light pollution.

It is another object of this invention to provide a dock pile lighting system with adjustable diameter lighting sources that is ultra highly efficient, utilizing low voltage LED light sources.

It is another object of this invention to provide a dock pile lighting system with adjustable diameter lighting sources that comprises UV lighting sources.

It is another object of this invention to provide a dock pile lighting system with adjustable diameter lighting sources that is waterproof and submersible.

It is another object of this invention to provide a dock pile lighting system with adjustable diameter lighting sources, which is of a durable and reliable construction.

It is yet another object of this invention to provide such a system that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Referring now to the drawings, the present invention is a lighting system and is generally referred to with numeral 50. It can be observed that it basically includes base cone assembly 200, tip cone 230, optic aligner and cone adapter/stabilizer 88, mast bolt 90, base plate 80, electrical system 100, an adjustable diameter lighting source, and wrap molding 60.

Figure 1:
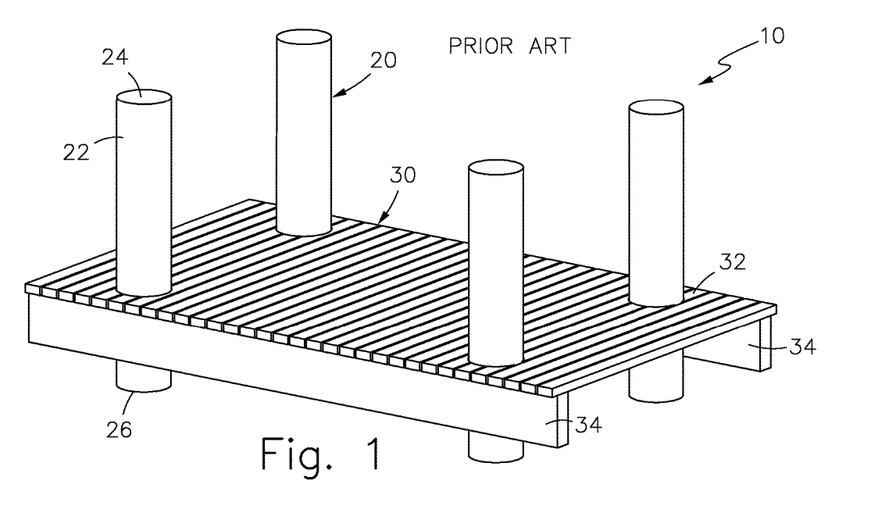
FIG. 1 is an isometric view of a prior art dock platform with four undressed dock piles.

As seen in FIG. 1, prior art 10 comprises dock platform 30 having decking 32 and joists 34. Dock platform 30 further has dock piles 20 comprising sidewall 22 extending between top end 24 and bottom end 26. Prior art 10 teaches dock piles 20 to be made of wood or cement.

Figure 2:
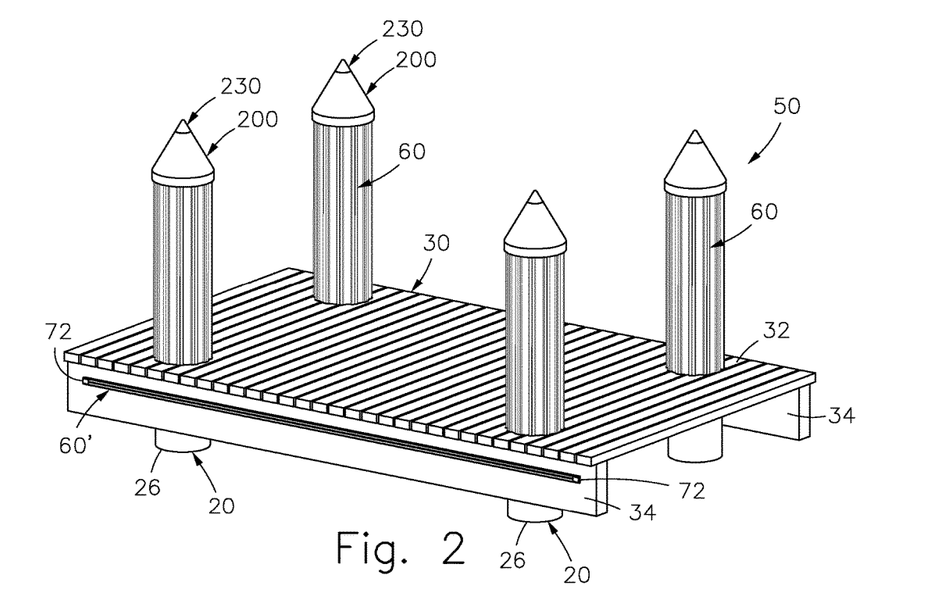
FIG. 2 is an isometric view of one of the preferred embodiments of the present invention mounted onto the prior art dock platform and the dock piles seen in FIG. 1.

As seen in FIG. 2, present invention 50 is mounted onto dock piles 20 that support dock platform 30. As seen in this illustration, tip cone 230 is mounted upon base cone assembly 200, and wrap molding 60 extends from base cone assembly 200 to decking 32. Base cone assembly 200 provides a weather resistant cavity to house lighting options. It is noted that base cone assembly 200 and tip cone 230 may take any ornamental shape, including but not limited to parabola, hemispheric, and curvilinear. However, in a preferred embodiment, they are a cone on cylinder configuration in an effort to deter bird loitering and to keep water out of the end grain of wood dock piles 20. In a preferred embodiment, base cone assembly 200 has a 45 or 60 degree angle. In a preferred embodiment, tip cone 230 comprises sidewalls having at least one light slot or clear section to permit light to emit there through and is threaded to secure onto mass bolt 90. Molding 60', comprising end-sourced lighting elements 72, may be mounted onto joists 34.

Figure 3:
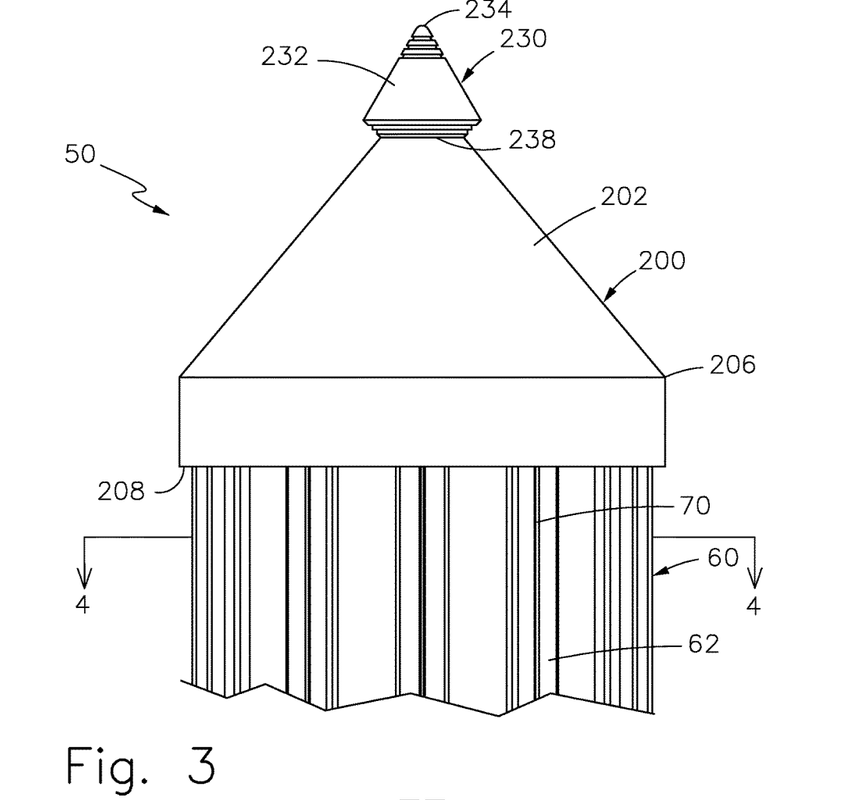
FIG. 3 is an elevation view of a dock pile having vertically mounted wrap molding, showing the abilities of rubber or plastic wrap molding in design, function and esthetics as well as housing at least one adjustable diameter lighting source, light emitting diode (LED), optic fiber, color bead, and/or rope lighting, while functioning as a bumper and concealing mounting hardware.
Figure 4:
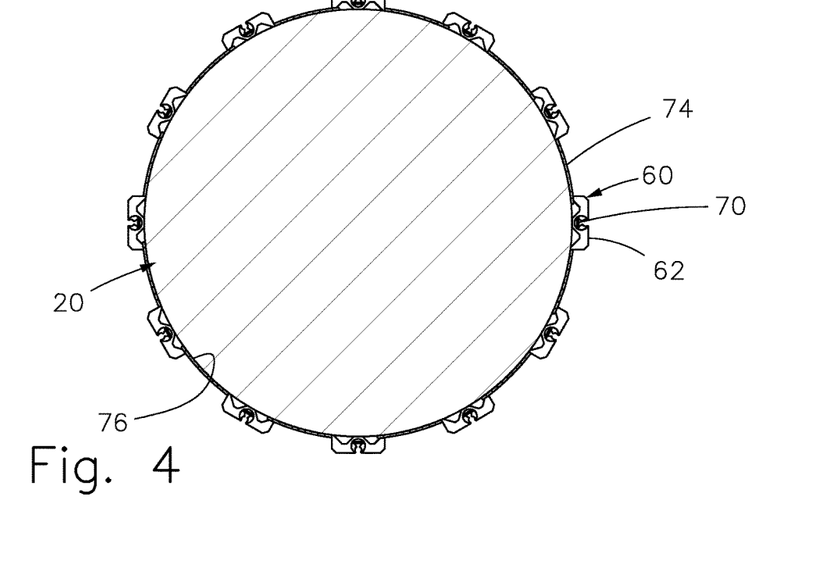
FIG. 4 is a sectional view of the dock pile having the vertically mounted wrap molding taken along the lines 4-4 as seen in FIG. 3.

As seen in FIGS. 3 and 4, present invention 50 is mounted onto a dock pile 20, whereby tip cone 230 is mounted upon base cone assembly 200. Tip cone 230 comprises sidewall 232 extending from end 234 to edge 238.

As best seen in FIG. 4, exterior flap wall 74 of wrap molding 60 extends tucking under the next wrap molding 60, repeating for full 360 degrees. Wrap molding 60 is marine grade rubber and allows unseen cable passage through passages in its underside while providing reflective surface for down washing with light. Wrap molding 60 can be any color or combinations of color.

Figure 5:
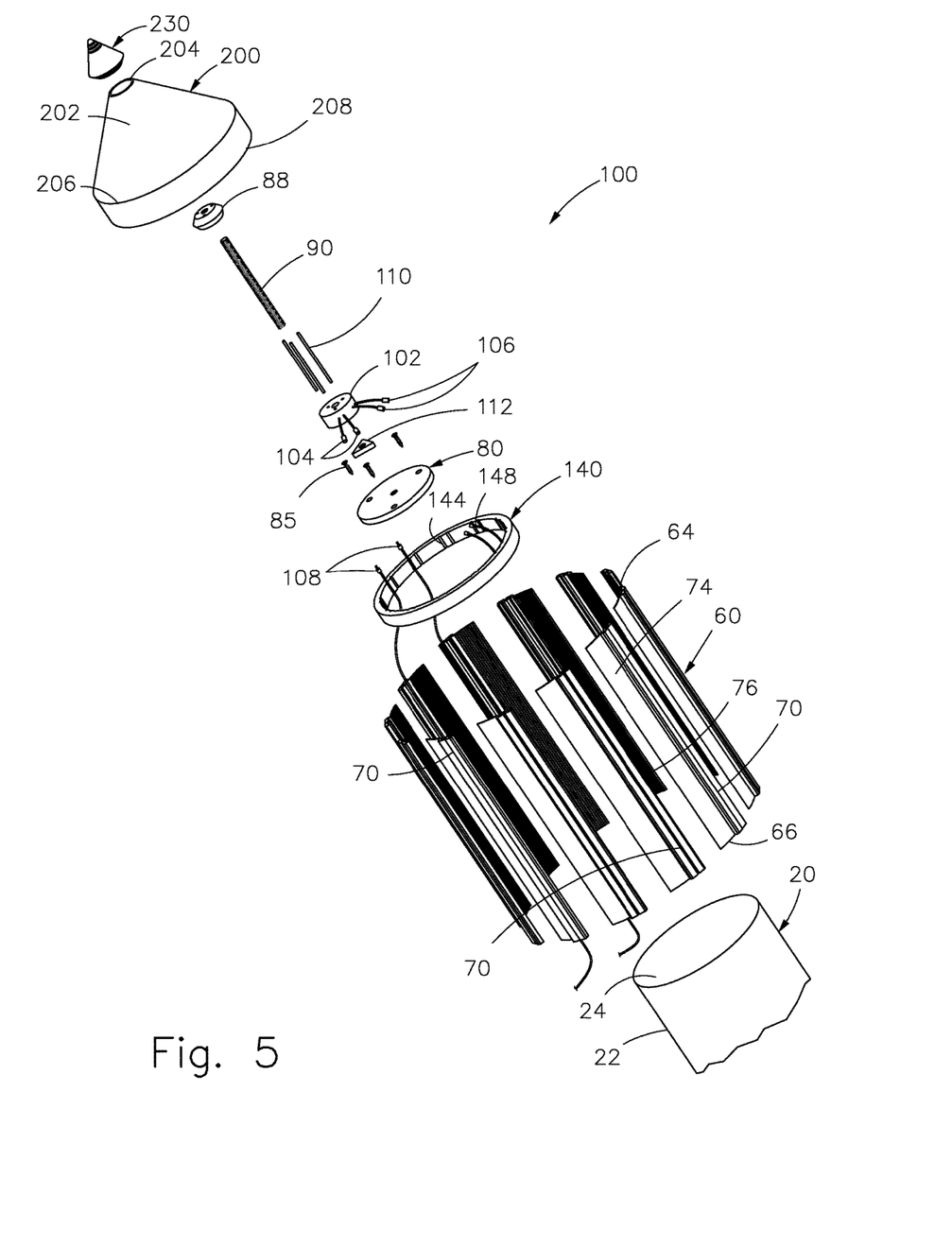
FIG. 5 is a top isometric exploded view of the present invention with an adjustable diameter flex lighting source.
Figure 6:
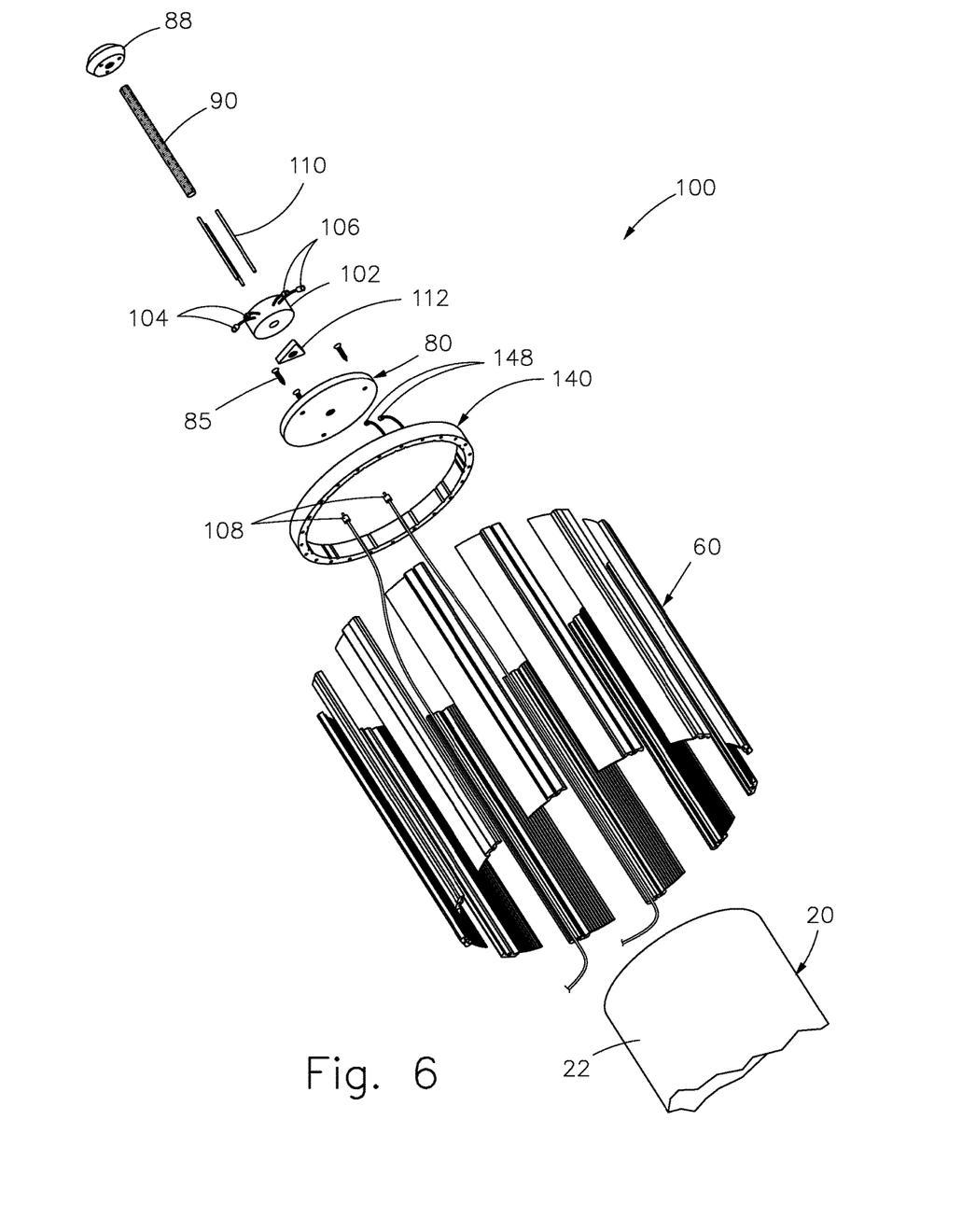
FIG. 6 is a bottom isometric exploded view of the present invention with the adjustable diameter flex lighting source and without the base cone assembly or tip cone.

As seen in FIGS. 5 and 6, tip cone 230 mounts upon base cone assembly 200 which houses electrical system 100.

In a preferred embodiment, tip cone 230 is threaded for mast bolt 90 and secures base cone assembly 200 by compression between tip cone 230 and optic aligner and cone adapter/stabilizer 88, which is also threaded for mast bolt 90. Lock nut 112 is triangularly shaped to deter tools and encourage hand tightening. Base plate 80 is through threaded in its center to receive mast bolt 90. Base plate 80 supports mast bolt 90 while providing correction to level and height if required. It is noted that mast bolt 90 can be entirely, or partially threaded as illustrated. Base plate 80 secures directly onto top end 24 of dock pile 20, and allows rigging of optic fibers 110, and/or 114, seen in FIGS. 7C and 7D, and/or light modules prior to placement of base cone assembly 200. Mast bolt 90 also supports LED source and regulator 102 in a centerline of base cone assembly 200 and is elevated to a desired height by mast bolt 90 threads. Optic fibers 110 are plugged into holes on top of LED source and regulator 102. For purposes of illustration, three holes are shown, but there can be any number of holes to receive optic fibers 110. Mounting hardware includes mounting screws 85 when base plate 80 is used. Otherwise mast bolt 90 threads directly into top end 24.

Base cone assembly 200 comprises sidewall 202 extending from top edge 204 to bottom edge 208, and may have transition edge 206. Base cone assembly 200 houses mast bolt 90, which extends from tip cone 230 to base plate 80. Secured by mast bolt 90 are optic aligner and cone stabilizer/adapter 88 and LED source and regulator 102.

Extending from LED source and regulator 102 are cable connector inputs 104 that supply power for two separate circuits from source cable connectors 108, defining a dual-circuit system. Also extending from LED source and regulator 102 are cable connector outputs 106 that feed cable connector inputs 148 of adjustable diameter flex lighting source 140. It is understood that optic fibers 110 extending from LED source and regulator 102 are sufficiently long to extend to and illuminate tip cone 230. Source cable connectors 108 may pass through an outer edge of base plate 80, or an inner edge of base cone assembly 200.

Figures 7A, 7B, 7C, 7D:
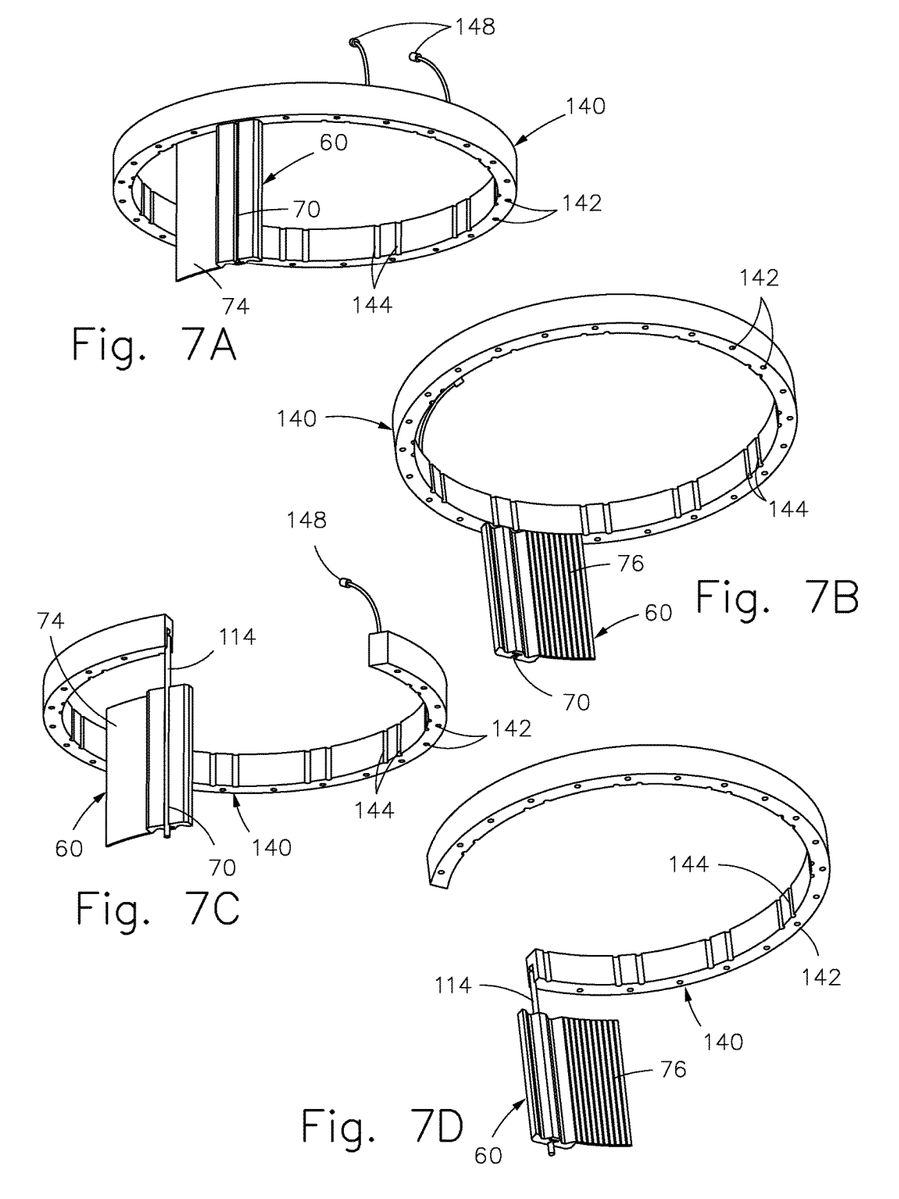
FIG. 7A is a first isometric view of the adjustable diameter flex lighting source with wrap molding biased thereon.
FIG. 7B is a second isometric view of the adjustable diameter flex lighting source with the wrap molding biased thereon.
FIG. 7C is a first isometric cut view of the adjustable diameter flex lighting source with the wrap molding containing optic fiber.
FIG. 7D is a second isometric cut view of the adjustable diameter flex lighting source with the wrap molding containing the optic fiber.

Adjustable diameter flex lighting source 140 routes a highly efficient LED light source to end light optic fibers 114, as seen in FIGS. 7C and 7D, and/or down wash dock pile 20 directly, or down wash exterior flap wall 74. Adjustable diameter flex lighting source 140 is made of a stretchable material, enabling it to stretch to fit different dock pile 20 diameters while maintaining symmetry in light source spacing. Adjustable diameter flex lighting source 140 may also stretch to irregular shapes if desired. Adjustable diameter flex lighting source 140 is sourced by LED source and regulator 102 that provides a sealed connection to optic fiber 110.

Electrical system 100 may further comprise infrared lighting for camera surveillance after lights-out and change light color to accommodate local turtle light laws. RF remote control RGB controllers, cell phone apps, WI-FI RGB controllers, or smart home systems may control present invention 50. Controllers can dim, blink, strobe, control color selection, vary from color to color, react to sound, and run pre-programmed sequences. A "react to sound" operation will change color and brightness as volume and frequency change. It can be fed by input or listen with a built-in microphone.

As seen in FIGS. 7A, 7B, 7C, and 7D, wrap molding 60 may receive at least one optic fiber 114, color bead, and/or rope lighting, and aesthetically hides and accommodates mounting hardware and wiring while protecting the optic fibers 114, any vessel, and/or pile 20.

Figures 8A, 8B:
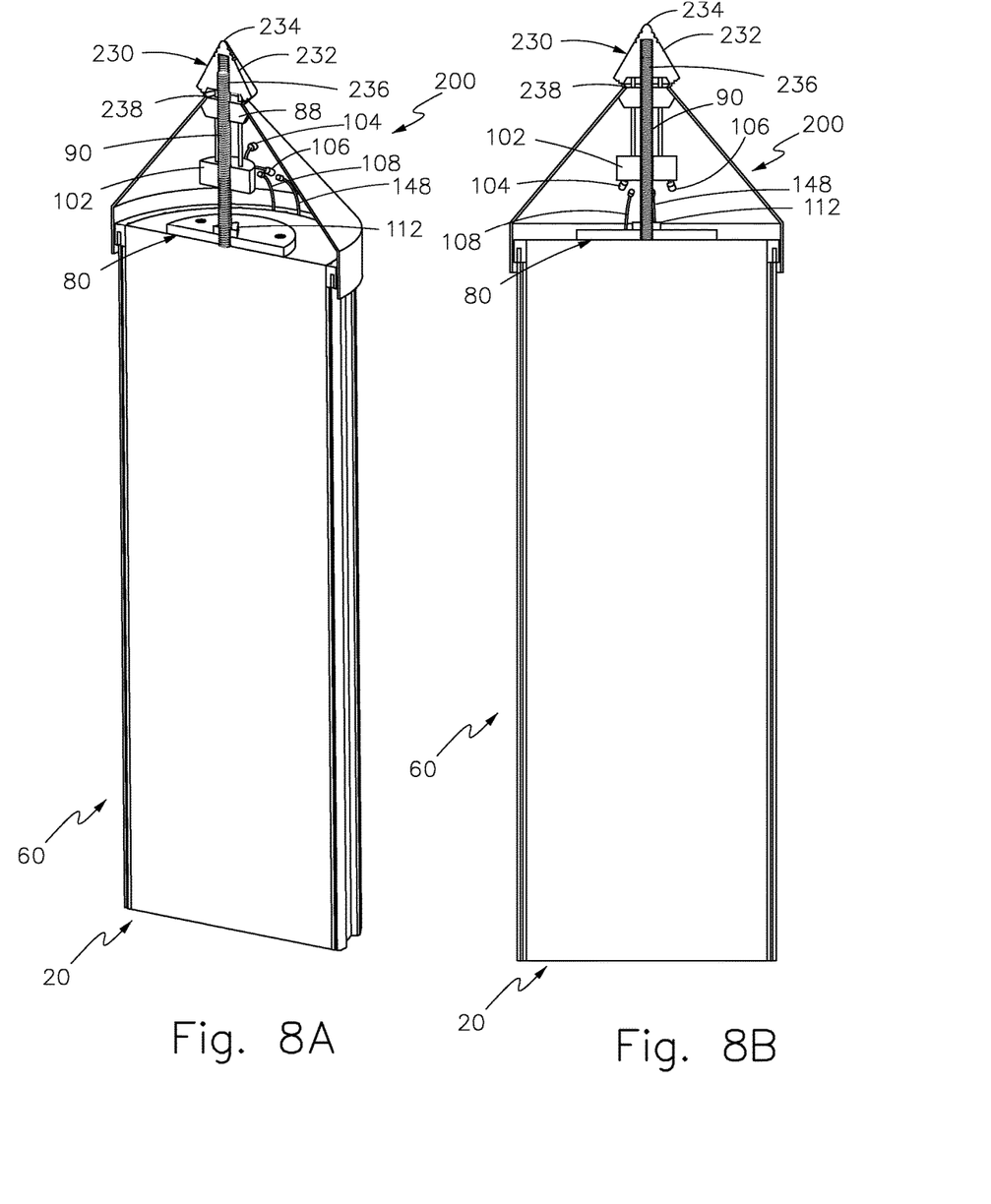
FIG. 8A is a first partial cross-section isometric view of a base cone assembly housing the adjustable diameter flex lighting source, illustrating a single-circuit system as an alternate embodiment.
FIG. 8B is a partial cross-section elevation view of the base cone assembly housing the adjustable diameter flex lighting source seen in FIG. 8A.
Figure 9:
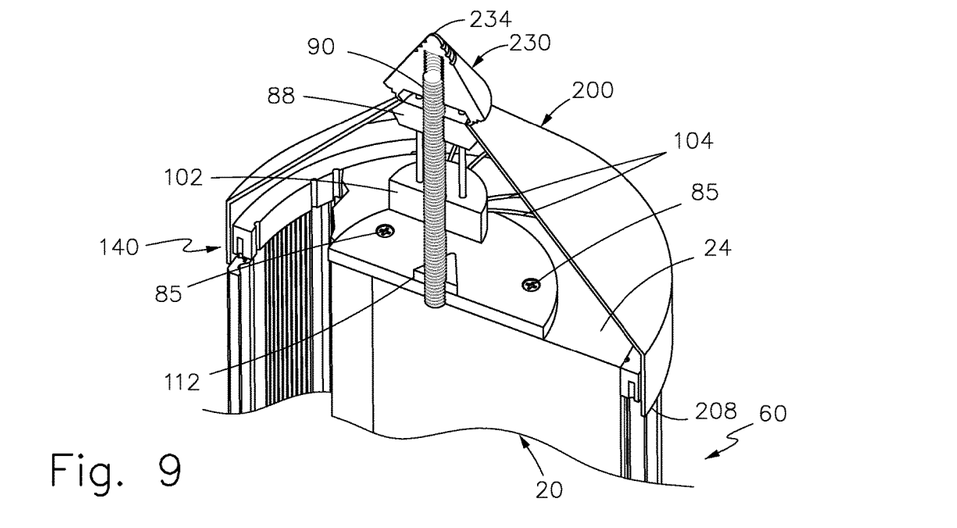
FIG. 9 is a second partial cross-section isometric view of a base cone assembly housing the adjustable diameter flex lighting source.

As seen in FIGS. 8A, 8B, and 9 base cone assembly 200 is secured by sandwiching it between tip cone 230 and optic aligner and cone stabilizer/adapter 88, which are drawn together on mast bolt 90, whereby tip cone 230 comprises threaded hole 236 to receive mast bolt 90. A location of optic aligner and cone stabilizer/adapter 88 on mast bolt 90 will determine an overall tip cone 230 height. In a preferred embodiment, optic aligner and cone stabilizer/adapter 88 has two face angles, 60 and 45 degrees, allowing snug fits to base cone assembly 200 depending on its orientation. Optic aligner and cone stabilizer/adapter 88 also has a through threaded center to receive mast bolt 90. It is noted that FIGS. 8A and 8B illustrate a single-circuit system as an alternate embodiment, whereby extending from LED source and regulator 102 is cable connector input 104 that supplies power for a single circuit from source cable connector 108. Also extending from LED source and regulator 102 is cable connector output 106 that feeds cable connector input 148 of adjustable diameter flex lighting source 140.

Figure 10A:
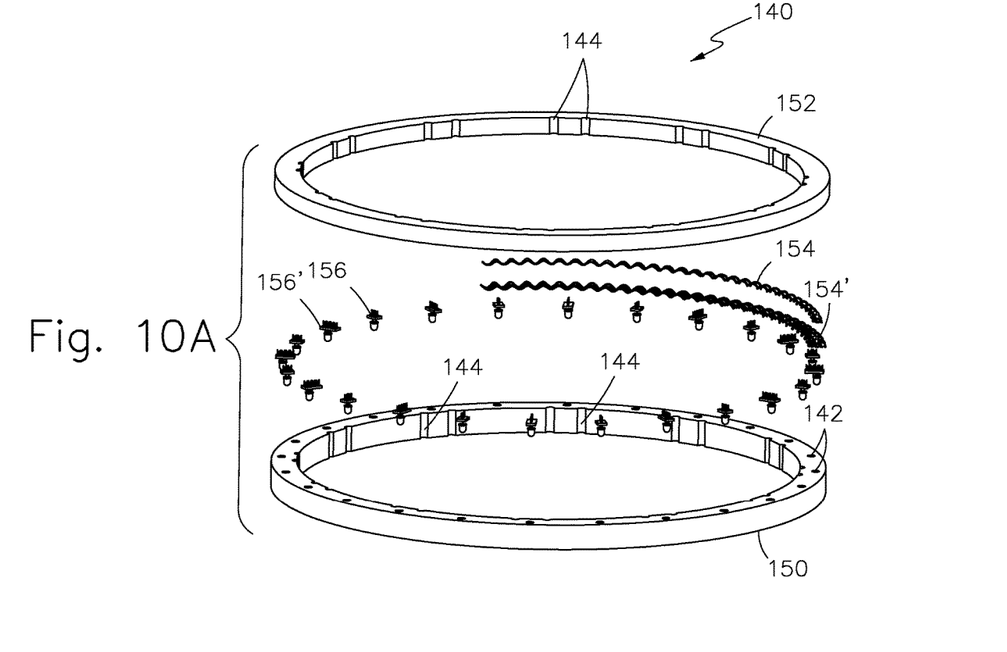
FIG. 10A is an exploded view of the adjustable diameter flex lighting source.

As seen in FIG. 10A, adjustable diameter flex lighting source 140 comprises base 150 having optic fiber alignment passages 142 to accommodate light sources such as LEDs 156 and 156' in a punch-down configuration. Furthermore, optic fiber alignment passages 142 receive LEDs 156 and 156' to snugly align with respective optic fibers 114. There can be alternate ways to do this as well. LEDs 156 and 156' serve as illumination means. Covering base 150 is cover 152, which can be adhered or vulcanized together. Cover 152 and base 150 have interior channels 144 to permit for the passage of wires and/or wire harnesses and optic fibers. Cover 152 and base 150 house internal wiring 154 and 154' that power LEDs 156 and 156'. Internal wiring 154 and 154' are two separate light circuits powered by LED source and regulator 102. Internal wiring 154 and 154' is spring wound, or in a zigzag configuration, to allow stretching. In one embodiment, internal wiring 154 is for white light/strobe for down washing between ribs from beneath base cone assembly 200, and internal wiring 154' is for color functions of optic fibers housed by wrap molding 60. Adjustable diameter flex lighting source 140 is UV resist, mold resist, opaque, has a good range in elasticity, is cold and hot tolerant, water proof, non conductive, has good ionic resilience, does not shrink, is moldable, and self adhering. Furthermore, all components of electrical system 100 are watertight, as well as the cable connectors.

Figure 10B:
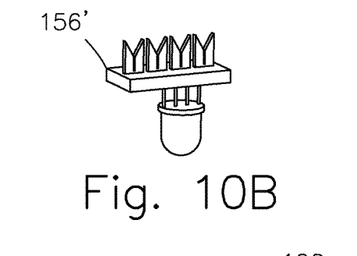
FIG. 10B is an isometric view of a four-pin LED system from the adjustable diameter flex lighting source seen in FIG. 10A.

Seen in FIG. 10B is sample four prong LED 156'.

Figure 10C:
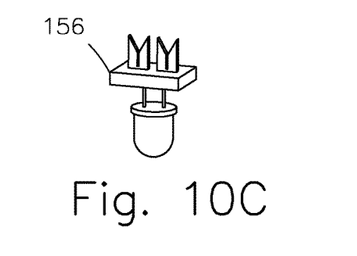
FIG. 10C is an isometric view of a two-pin LED system from the adjustable diameter flex lighting source seen in FIG. 10A.

Seen in FIG. 10C is sample two prong LED 156.

Figures 11A, 11B, 11C:
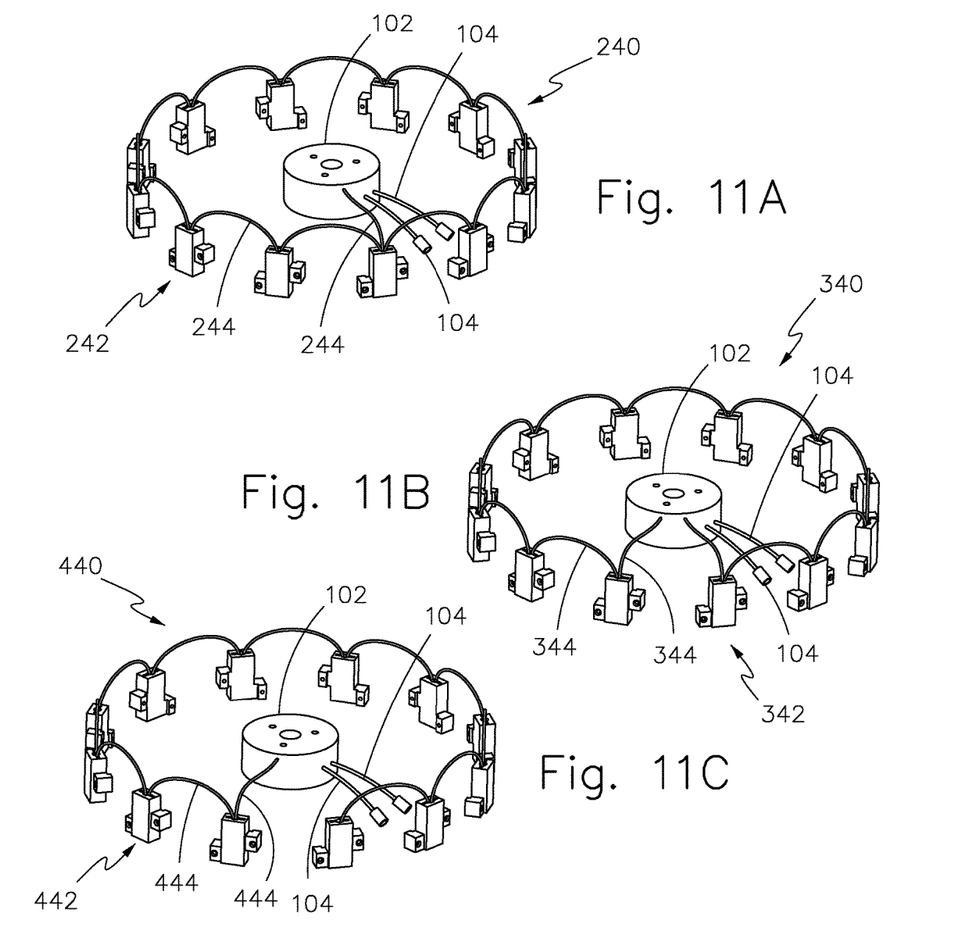
FIG. 11A is an isometric view of an adjustable diameter closed chain lighting source.
FIG. 11B is an isometric view of an adjustable diameter semi open-ended chain lighting source.
FIG. 11C is an isometric view of an adjustable diameter open-ended chain lighting source.

Seen in FIG. 11A is adjustable diameter closed chain lighting source 240 as a first alternate embodiment adjustable diameter lighting source. Adjustable diameter closed chain lighting source 240 comprises LED source and regulator 102. Extending from LED source and regulator 102 is LED light source, board 86 electrical connection 244 that extends to one of source blocks 242. Other LED light source, board & electrical connections 244 connect to source blocks 242. Optic fibers 110, seen in FIGS. 5 and 6, can be plugged into the holes on top of LED source and regulator 102, and optic fibers 114, seen in FIGS. 7C and 7D can be plugged into source blocks 242 at aperture 248, seen in FIG. 12B.

Seen in FIG. 11B is adjustable diameter semi open-ended chain lighting source 340 as a second alternate embodiment adjustable diameter lighting source. Adjustable diameter semi open-ended chain lighting source 340 comprises LED source and regulator 102. Extending from LED source and regulator 102 are LED light source, board & electrical connection 344 that extends to two source blocks 342. Other LED light source, board & electrical connections 344 connect to source blocks 342. Optic fibers 110, seen in FIGS. 5 and 6, can be plugged into the holes on top of LED source and regulator 102, and optic fibers 114, seen in FIGS. 7C and 7D can be plugged into source blocks 342.

Seen in FIG. 11C is adjustable diameter open-ended chain lighting source 440 as a third alternate embodiment adjustable diameter lighting source. Adjustable diameter open-ended chain lighting source 440 comprises LED source and regulator 102. Extending from LED source and regulator 102 is LED light source, board & electrical connection 444 that extends to one of source blocks 442. Other LED light source, board & electrical connections 444 connect to source blocks 442. Optic fibers 110, seen in FIGS. 5 and 6, can be plugged into the holes on top of LED source and regulator 102, and optic fibers 114, seen in FIGS. 7C and 7D can be plugged into source blocks 442.

Figure 11D:
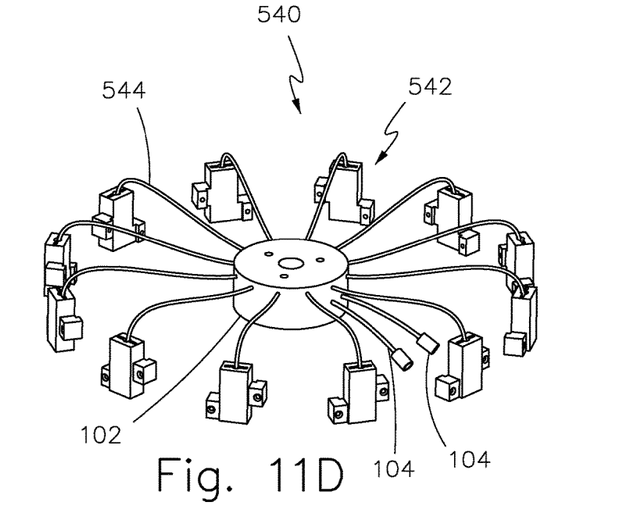
FIG. 11D is an isometric view of an adjustable diameter radial lighting source.

Seen in FIG. 11D is adjustable diameter radial lighting source 540 as a fourth alternate embodiment adjustable diameter lighting source. Adjustable diameter radial lighting source 540 comprises LED source and regulator 102. Extending from LED source and regulator 102 is LED light source, board & electrical connection 544 that extends to each source block 542. Optic fibers 110, seen in FIGS. 5 and 6, can be plugged into the holes on top of LED source and regulator 102, and optic fibers 114, seen in FIGS. 7C and 7D can be plugged into source blocks 542.

Figure 12A:
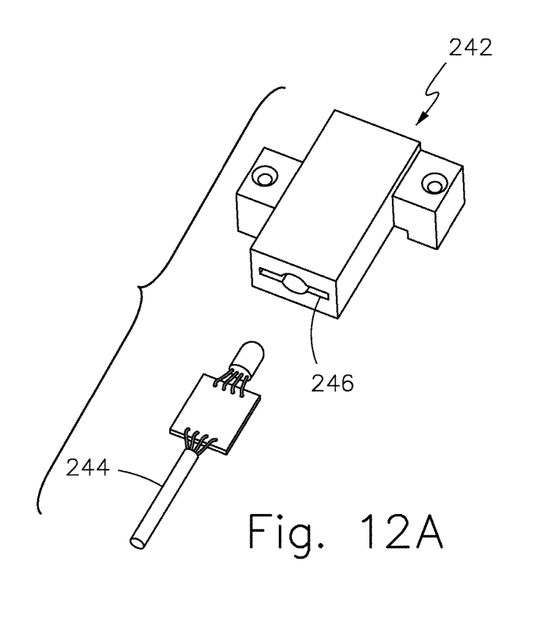
FIG. 12A is an isometric view of a source block for the adjustable diameter closed, semi open-ended, or open-ended chain lighting source, or the adjustable diameter radial lighting source.
Figure 12B:
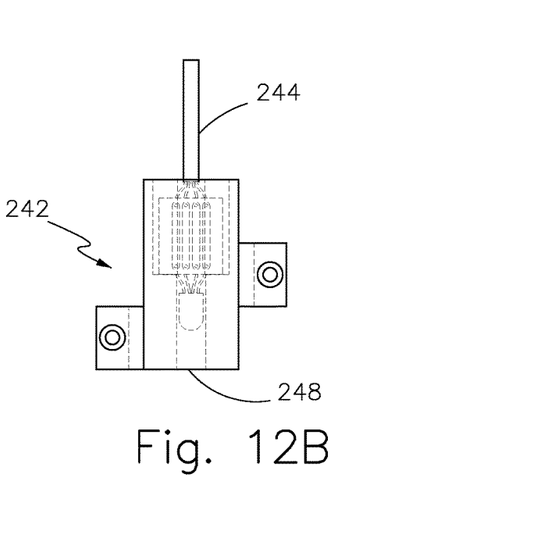
FIG. 12B is an elevation view of the source block with wiring secured therein.

As seen in FIGS. 12A and 12B, source block 242 comprises slit 246 to receive LED light source, board & electrical connection 244. Although not illustrated, it is noted that each source block 342, 442, and 542 also comprises a slit, such as slit 246 to receive respective LED light source, board & electrical connections 344, 444, and 544. Source blocks are configured to permit adjustable diameter closed chain lighting source 240, adjustable diameter semi open-ended chain lighting source 340, adjustable diameter open-ended chain lighting source 440, and adjustable diameter radial lighting source 540 to be mounted in a close proximity and/or diagonally mounted without overlap if desired due to an offset mounting configuration, whereby their legs raise the block assemblies to allow wire passage from between mold to LED source and regulator 102, and fixed thereon by screws or bolts. Source block 242 also comprises aperture 248 to receive optic fibers 114, seen in FIGS. 7C and 7D. Although not illustrated, it is noted that each source block 342, 442, and 542 also comprises an aperture, such as aperture 248 to receive respective optic fibers.

Figure 13A:
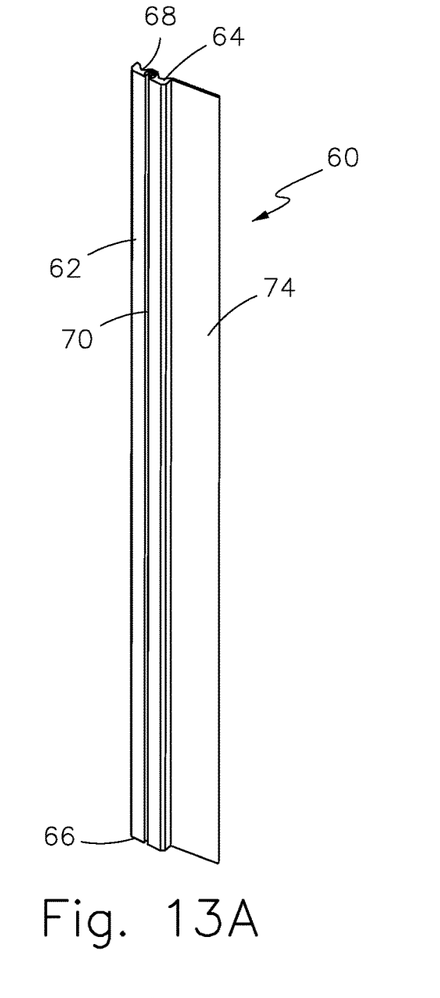
FIG. 13A is an isometric view of a wrap molding exterior wall section.
Figure 13B:
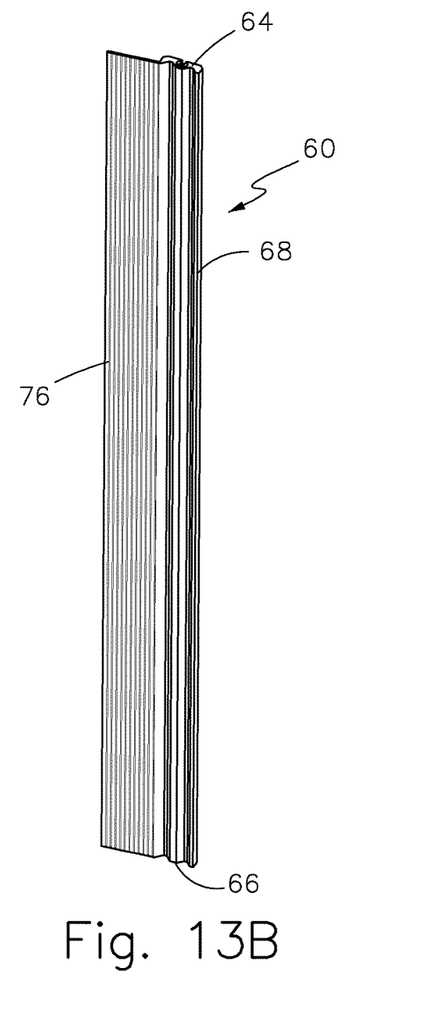
FIG. 13B is an isometric view of the wrap molding interior wall section.
Figure 13C:
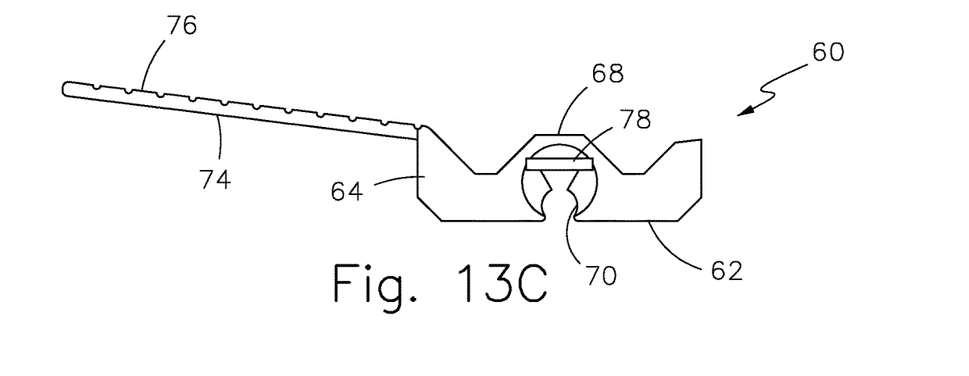
FIG. 13C is a top view of the wrap molding section.

As seen in FIGS. 13A, 13B, and 13C, wrap-molding 60 comprises exterior wall 62 having exterior flap wall 74, and interior wall 68 having interior flap wall 76, that extend between top end 64 and bottom end 66. Interior flap wall 76 is ribbed to encourage consistent vertical folding patterns or tendencies. Wrap molding 60 further comprises a first design pattern, whereby channel 70, on exterior wall 62, receives at least one optic fiber 114, color bead, and/or rope lighting, and hides and accommodates mounting hardware. Wrap-molding 60 further comprises stiffener 78. A larger circular shape encompassing stiffener 78, and channel 70 is a white, co-extruded section for light reflection. Mounting hardware is hidden by an opaque back half of optic fibers 114 inserted into channels 70. In a preferred embodiment, wrap molding 60 is manufactured of rubber and/or plastic materials, or of other materials having similar characteristics, to effectively house at least one optic fiber, color bead, and/or rope lighting, and function as a bumper. Wrap molding 60 is mounted onto dock pile 20. Present invention 50, and particularly wrap molding 60 is made of any color and of weather, ultra violet, and impact resistant materials.

Figure 14A:
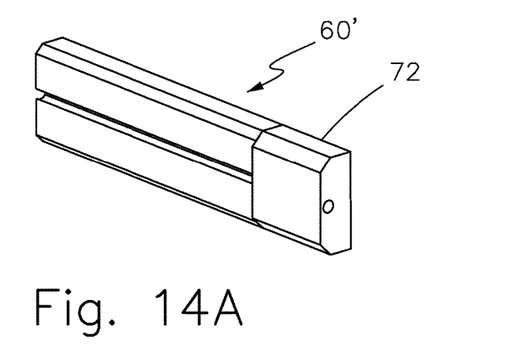
FIG. 14A is a first isometric view of a molding section having an end-sourced lighting element.
Figure 14B:
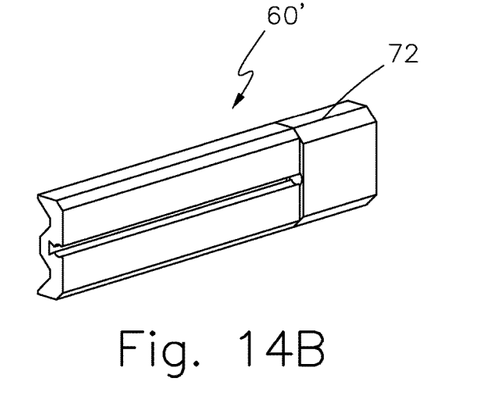
FIG. 14B is a second isometric view of the molding section having the end-sourced lighting element.

As seen in FIGS. 14A and 14B end sourced lighting element 72 links with molding 60', which covers all mounting hardware.

Figure 15A:
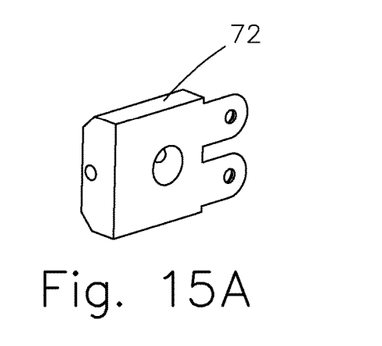
FIG. 15A is an isometric view of an end-sourced lighting element interior face section showing mounting tabs.
Figure 15B:
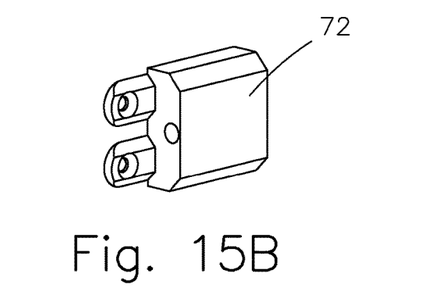
FIG. 15B is an isometric view of an end-sourced lighting element exterior face section.
Figure 15C:
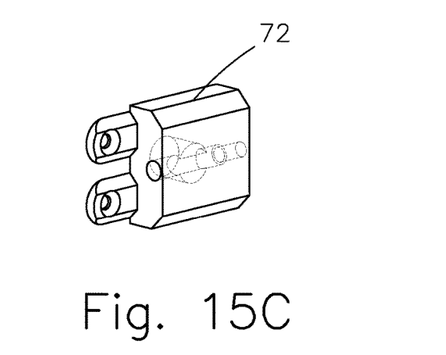
FIG. 15C is an isometric view of the end-sourced lighting element exterior face section with passages for wiring therein.

Seen in FIGS. 15A, 15B, and 15C is end sourced lighting element 72.

Figure 16A:
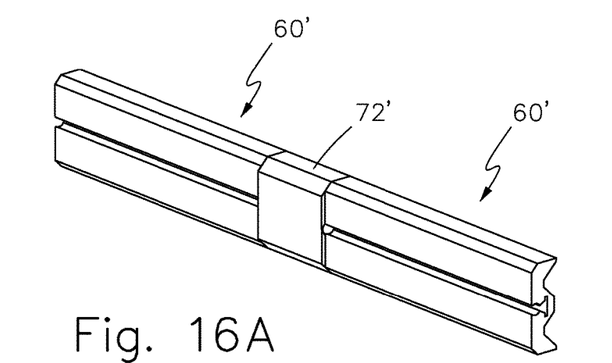
FIG. 16A is a first isometric view of the molding section having a bridge-sourced lighting element.
Figures 16B, 17A, 17B, 17C:
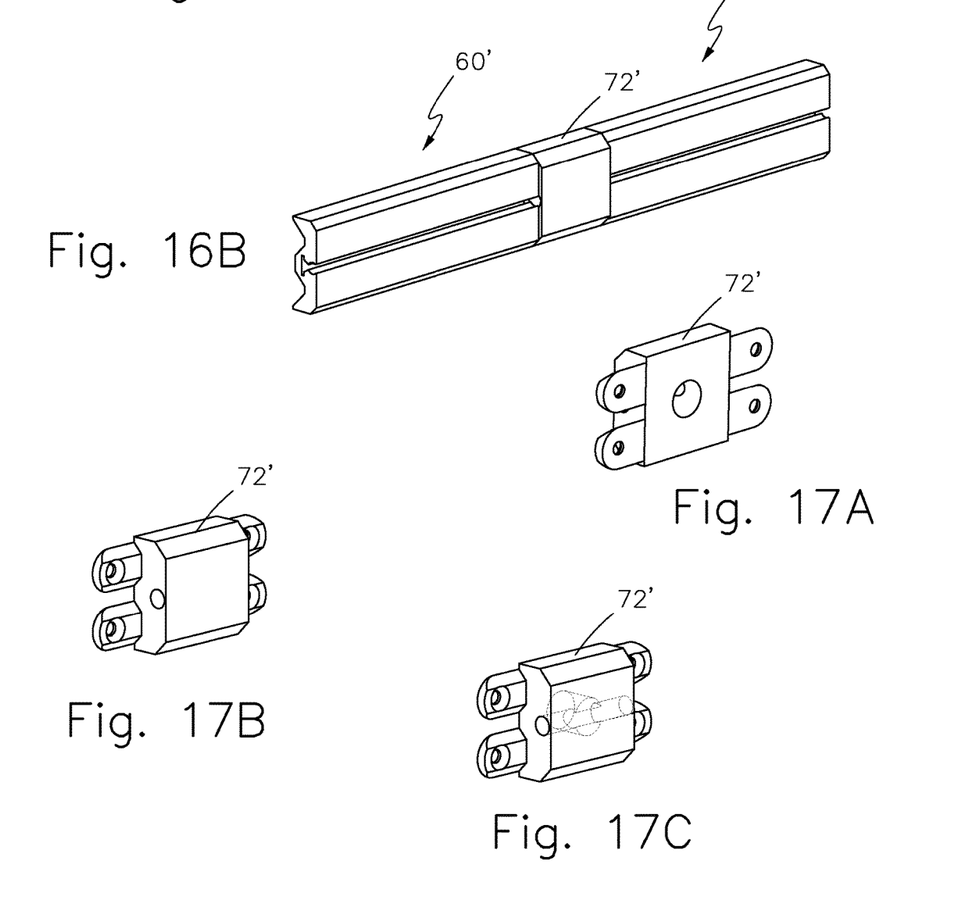
FIG. 16B is a second isometric view of the molding section having the bridge-sourced lighting element.
FIG. 17A is an isometric view of a bridge-sourced lighting element interior face section showing mounting tabs.
FIG. 17B is an isometric view of a bridge-sourced lighting element exterior face section.
FIG. 17C is an isometric view of the bridge-sourced lighting element exterior face section with passages for wiring therein.

As seen in FIGS. 16A and 16B bridge sourced lighting elements 72' links with molding 60', which covers all mounting hardware.

Seen in FIGS. 17A, 17B, and 17C is bridge sourced lighting element 72'.

It is noted that present invention 50 adapts onto any prior art cone assembly that is mounted onto dock piles 20. This is done by drilling a hole at a tip of the prior art cone assembly and installing present invention 50 including mast bolt 90 thereon rather than driving unsightly screws through them. This is an important cost cutting feature. Present invention 50 may also comprise UV lighting sources.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A lighting system, comprising:
   A) a base cone assembly;
   B) a base plate that mounts onto a dock pile having a dock pile diameter;
   C) an electrical system comprising at least one adjustable diameter lighting source with at least one LED source, regular, and optic fiber, said at least one adjustable diameter lighting source comprises an adjustable diameter flex lighting source comprising a base having optic fiber alignment passages to accommodate said at least one LED source and optic fiber in a punch-down configuration, covering said base is a cover, said cover and said base have interior channels configured for passage of wires and/or wire harnesses and said optic fibers, and house internal wiring that power said at least one LED source, said adjustable diameter flex lighting source is made of a stretchable material to stretch to mount onto different diameters of said dock pile diameter;
   D) a tip cone mounted onto said base cone assembly, a mast bolt extends from the tip cone to the base plate such that said base cone assembly mounts onto said dock pile; and
   E) wrap moldings disposed around an outer circumference of said dock pile diameter of said dock pile, said wrap molding comprises at least one wrap molding channel, said at least one wrap molding channel receive said optic fibers, a color bead, and/or a rope lighting of said electrical system, whereby said said at least one LED source illuminate said optic fibers.

2. The lighting system set forth in claim 1, further characterized in that said tip cone comprises at least one light slot or clear section to permit light to emit there through.

3. The lighting system set forth in claim 1, further characterized in that said tip cone and said base cone assembly are apex shaped.

4. The dock pile lighting system set forth in claim 1, further characterized in that said at least one adjustable diameter lighting source comprises an adjustable diameter closed chain lighting source.

5. The dock pile lighting system set forth in claim 1, further characterized in that said at least one adjustable diameter lighting source comprises an adjustable diameter semi open-ended chain lighting source.

6. The dock pile lighting system set forth in claim 1, further characterized in that said at least one adjustable diameter lighting source comprises an adjustable diameter open-ended chain lighting source.

7. The dock pile lighting system set forth in claim 1, further characterized in that said at least one adjustable diameter lighting source comprises an adjustable diameter radial lighting source.

8. The lighting system set forth in claim 1, further characterized in that said at least one adjustable diameter lighting source emits radial and/or downward lighting onto said dock pile.

9. The lighting system set forth in claim 1, further characterized in that said wrap molding comprises exterior and interior walls and exterior and interior flap walls extending between top and bottom ends.

10. The lighting system set forth in claim 1, further comprising molding.

11. The lighting system set forth in claim 10, further characterized in that said molding comprises at least one molding channel.

12. The lighting system set forth in claim 11, further characterized in that said at least one molding channel may receive said optic fiber, said color bead, and/or said rope lighting of said electrical system.

13. The lighting system set forth in claim 11, further characterized in that said molding comprises exterior and interior walls extending between top and bottom ends.

* * * * *